United States Patent [19]

Hansen et al.

[11] Patent Number: 5,032,629

[45] Date of Patent: Jul. 16, 1991

[54] EPOXY HARDENING AGENTS

[75] Inventors: Achim Hansen, Düsseldorf; Alfred Mathes, Duisburg; Jürgen Zehrfeld, Voerde, all of Fed. Rep. of Germany

[73] Assignee: Rutgerswerke AG, Fed. Rep. of Germany

[21] Appl. No.: 486,899

[22] Filed: Feb. 28, 1990

[30] Foreign Application Priority Data

Mar. 13, 1989 [DE] Fed. Rep. of Germany ....... 3908085

[51] Int. Cl.$^5$ ...................... C08G 59/50; C08L 63/00
[52] U.S. Cl. .................................. 523/414; 523/417; 528/103; 528/111; 528/361; 528/407; 564/325; 564/505
[58] Field of Search ................. 528/99, 111, 361, 103, 528/407; 564/325, 505

[56] References Cited

U.S. PATENT DOCUMENTS

| | | | |
|---|---|---|---|
| 4,423,170 | 12/1983 | Waddill | 528/111 X |
| 4,608,405 | 8/1986 | De Gooyer | 528/111 X |
| 4,810,535 | 3/1989 | McCollum et al. | 528/111 X |
| 4,835,241 | 5/1989 | Waddill | 528/111 |
| 4,886,867 | 12/1989 | Lin et al. | 528/111 |
| 4,940,770 | 7/1990 | Speranza et al. | 528/111 |

*Primary Examiner*—Earl Nielsen
*Attorney, Agent, or Firm*—Bierman and Muserlian

[57] ABSTRACT

Novel hardening agents for epoxy compounds which are produced by reaction of polyalkylene, polyether amines having a mean molecular weight of 148 to 5,000 with di and/or polyepoxy compounds to a preliminary product, the ratio of the hydrogen atoms possibly remaining after reaction with monoepoxy compounds and bound to nitrogen and which are capable of reaction with epoxide groups, to epoxide groups of diepoxy compounds or polyepoxy compounds in the range of 1:1.4 to 6, and reaction of this preliminary product with a primary or secondary amine, the employed amine or amine mixture being used in an amount such that the ratio of epoxide groups capable of reaction to hydrogen atoms attached to nitrogen is 1:2 to 10.

17 Claims, No Drawings

EPOXY HARDENING AGENTS

STATE OF THE ART

EP-B 0,000,605 describes hardening agents for aqueous epoxy resin dispersions which are produced by reaction of addition products of polyalkylene polyetherpolyols and water-insoluble polyepoxy compounds with polyamines, with unsaturated compounds capable of addition being further added to the reactive groups of the polyamines. These hardeners make possible the production of high-grade epoxy resin dispersions which are used as coatings and also as cement additives with good service properties. However, they have a number of disadvantages such as high viscosities, unfavorable reactivities and a dark color. The cause for this resides essentially in the type of the substances used and of the reaction route resulting therefrom for the composition of the compounds with emulsifier properties.

Thus, the reaction of polyalkylene polyetherpolyols with diepoxy compounds requires a $BF_3$-amine catalyst and is feasible only at temperatures above 160° C. Due to this, despite the use of a relatively high excess of diepoxy compound, secondary reactions lead to products of high viscosity and to molecular weight distributions unfavorable for the reactivity. Furthermore, the reaction product of polyalkylene polyetherpolyls and diepoxy compounds of a technically desirable relatively low viscosity, caused by the necessary molar ratio, contains a high proportion of unreacted diepoxy compounds. Because of the consequent reaction with amines, this often has an adverse effect on the emulsifier properties of the end product and due to reaction temperatures of 160° C., the reaction product takes on a dark color.

OBJECTS OF THE INVENTION

It is an object of the invention to provide water-emulsifying hardeners for epoxy compounds which have a greatly improved property profile, showing particularly an improved emulsifying action as well as low viscosity and light color.

It is another object of the invention to provide novel epxoy compositions and products produced therefrom.

These and other objects and advantages of the invention will become obvious from the following detailed description.

THE INVENTION

The novel hardening agents of the invention for epoxy compounds are comprised of a reaction product of a) a preliminary product of at least one member of the group consisting of polyalkylene polyether monoamines and diamines and polyamines with a mean molecular weight of 148 to 5000 optionally reacted with monoepoxy compounds and with at least one member of the group consisting of diepoxy compounds and polyepoxy compounds optionally admixed with monoepoxy compounds having a ratio of hydrogen atoms optionally remaining after a reaction with monoepoxy compounds and bound to nitrogen and capable of reaction with epoxide to epoxides of diepoxy compounds of 1:1.4 to 6 and b) at least one member of the group consisting of primary and secondary aliphatic, aralphatic, cycloaliphatic, aromatic and heterocyclicmono-, di- and polyamines, the amine being such that the ratio of reactive epoxide group to hydrogen atoms on the nitrogen is 1:2 to 10.

The hardening agent of the invention can be used alone or with other conventional epoxy hardeners with at least one epoxy compound with water to form coatings or additives for hydraulic binders or with at least one epoxy compound for adhesives and luting materials and for flexible shapes, flat structures or laminates.

By reaction of polyalkylene polyetheramines with an excess of di- or polyepoxy compounds and further reaction of the epoxide-terminal intermediate products thus obtained with amines, light-colored, amino-terminal products are obtained which have a relatively low viscosity, excellent shelf life, and outstanding hardening properties. The products are reactive hardening agents for epoxy resins with specifically adjustable, constant hardening properties which can be employed for specific purposes over a broad temperature range down to about 0° C. as well as at elevated temperatures. The hardened products obtained are outstanding for their good mechanical properties, excellent stability to chemicals and aging, and particularly for good flexibilizing action.

Surprisingly, very good compatibilities in the formulations are achieved with these products and segregation during storage of the hardening agents is avoided. Moreover, most of the hardening agents produced by the invention prepared from polyalkylene polyetheramines solid at room temperature are liquid which offers considerable advantages in their application.

U.S. Pat. No. 4,421,906 tried to eliminate these disadvantages by incorporating the flexibilizing component in the resin. Adducts from polyalkylene polyetheramines and bisphenol-A-diglycidyl ethers were produced which are hardened with polyaminoamides. However, the adducts of epoxy compounds and polyalkylene polyetheramines have only a limited shelf life and therefore are not very suitable for practical use.

The hardening agents according to the invention are obtained by reaction of polyalkylene polyetherpolyamines with epoxy compounds which contain more than one epoxy group per molecule, and subsequent reaction of the epoxide-terminal reaction product with polyamines. The reaction of the polyalkylene polyetherpolyamines with epoxy compounds occurs at low temperature without a catalyst and with a high selectivity. Even with a low molar excess of epoxy compound, products of comparatively low viscosities and narrow molecular weight distribution as well as low molar mass are obtained. In addition, these products contain very low percentages of free epoxy compounds or none at all which has a favorable effect on the final properties of the hardening agents. Moreover, the tertiary amine formed by reaction of polyalkylene polyetherpolyamines and epoxy compounds has a positive catalytic effect on the later hardening process. Besides, the production of hardening agents at lower temperatures leads to products of light color.

The amino-terminal hardening agents produced by the invention are mixed, optionally with additional reactive hardener components, commercial additives such as leveling agents, antifoam agents, deaerators, etc., as well as other substances known as additives for hardening agents for epoxy resins such as solvents, accelerators, etc.—with epoxy compounds, particularly epoxy resins with at least two epoxide groups per molecule unit, in equimolar ratio of amino and epoxide groups, and dispersed or emulsified, optionally after the addition of water with intensive stirring, applied as an emulsion or dispersion and allowed to cure. The curing takes place, depending on the requirements, at low temperatures down to about 0° C. within 3 to 72 hours after the mixing or at elevated temperatures.

The hardening agents of the invention may also be combined in a known manner with additional common amine hardeners such as aliphatic and/or cycloaliphatic polyamines, amino-terminal polyalkyl ethers, primary longer-chained monoamines, or amine-terminal butadiene acrylonitrile copolymers to form hardener mixtures for epoxy compounds. Such hardener mixtures also can be emulsified in water.

The production of the new hardening agents occurs in two reaction steps from preliminary products known in themselves:

(1) Reaction of polyalkylene polyetheramines with di- and/or poly-epoxy compounds optionally mixed also with monoepoxy compounds.

(2) Reaction of the reaction product from (1) with polyamines, optionally with subsequent chemical modification.

The first reaction step takes place by mixing the reagents with one another at temperatures in the range of 20° to 120° C., more particularly 50° to 90° C., and maintaining the reaction mixture for several hours, i.e. 1 to 5 hours, at a temperature in this range.

As amine components for the first reaction step, commercial polyalkylene polyethermonoamines and/or diamines and/or polyamines are used. These polyalkylene polyetheramines have mean molecular weights of 148 to 5000, preferably between 400 and 2000.

The basis of the polyalkyl polyether units may be ethyl, propyl, and butyl units and they may involve reaction products of ethylene oxide, propylene oxide, butylene oxide or respectively amylene oxide with monovalent and/or polyvalent alcohols, or tetrahydrofuran based polyethers. Possibly, the polyalkylene polyether chains are hetero or block copolymers. Especially preferred are polyalkylene polyetheramines based on ethylene oxide or propylene oxide.

As epoxy components for the first reaction step, there are used mainly epoxy compounds with more than one epoxide group per molecule. To reduce the amine functionality of the polyalkylene polyetheramines, epoxy compounds with only one epoxide group per molecule unit may be employed. These involve aliphatic, araliphatic, cycloaliphatic, aromatic or heteroaromatics containing compounds with one epoxide group per molecule. Examples are butyl glycidyl ethers, hexyl glycidyl ethers, phenyl glycidyl ethers, or cresyl glycidyl ethers but other monoglycidyl compounds such as glycidyl esters, amines, thioethers, amides, (iso)cyanates and aralkylene oxides can be used.

From the large number of polyfunctional epoxy compounds containing more than one 1,2-epoxide group per molecule, examples are epoxides of polyunsaturated hydrocarbons (vinyl cyclohexane, dicyclopentadiene, cyclohexadiene, cyclododecadiene, cyclododecatriene, isoprene, 1,5-hexadiene, butadiene, polybutadiene, divinyl benzenes, etc.); oligomers of epichlorohydrin and the like: epoxide ether of polyvalent alcohols (ethylene, propylene and butylene glycols, polyglycols, thiodiglycols, glycerin, pentaerythritol, sorbitol, polyvinyl alcohol, polyallyl alcohol and the like): epoxide ethers of polyvalent phenols (resorcinol, hydroquinone, bis-(4-hydroxyphenyl)-methane bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3-methylphenyl)-propane, 2,2-bis-(4-hydroxy-3,5-dichlorophenyl)-propane, bis-(4-hydroxyphenyl)-phenylmethane, bis-(4-hydroxyphenyl)-diphenylmethane, bis-(4-hydroxyphenyl)-4'-methylphenylmethane, 1,1-bis-(4-hydroxyphenyl)-2,2,2-trichloroethane, bis-(4-hydroxyphenyl)-(4-chlorophenyl)-methane, 1,1-bis-(4-hydroxyphenyl)-cyclohexane, bis-(4-hydroxyphenyl)-cyclohexylmethane, 4,4'-dihydroxydiphenyl, 2,2'-dihydroxydiphenyl, 4,4'-dihydroxydiphenyl sulfone, as well as their hydroxyethyl ethers, phenol formaldehyde condensation products such as phenol alcohols, phenol aldehyde resins and the like, S- and N-containing epoxides, (N,N'-diglycidyl aniline, N,N'-dimethyldiglycidyl-4,4-diaminodiphenyl methane) as well as epoxides produced by common methods from polyunsaturated carboxylic acids or monoun-saturated carboxylic acid esters of unsaturated alcohols, glycidyl esters, polyglycidyl esters which can be produced by polymerization or copolymerization of glycidyl esters of unsaturated acids or are obtainable from other acid compounds (cyanuric acid diglycidyl sulfide, cyclic trimethylene trisulfone or their derivatives and others).

Preferred epoxy compounds are polyphenol glycidyl ethers, e.g. the reaction products of epichlorohydrin and bisphenol A or bisphenol F. Such epoxy resins have an epoxide equivalent of 160 to 500. The polyfunctional epoxy compounds which includes epoxy resins can be reacted by the method alone or in mixture, optionally in the presence of solvents. They can also be empoyed in mixture with monoepoxides.

The ratios of polyalkylene polyetheramines and epoxy compounds must be chosen so that the resulting products contain at least one free epoxide group per molecule, that is, the quantity of epoxide groups with more than one epoxide group per molecule is chosen so that the ratio of hydrogen atoms, optionally remaining after reaction with monoepoxides and bound to nitrogen and which are capable of reacting with epxoide groups, to epoxide groups of diepoxy compounds or polyepoxy compounds is in the range of 1:1.4 to 6.

As amine components for the second reaction step, there are used commercial monoamines, diamines and polyamines which can be used in each instance alone or in mixtures with one another. The amines and mixtures can be selected at will over a wide range, but the amines participating in the reaction must have at least one primary amino group or, when using secondary amines, have at least two secondary amino groups to ensure that the desired end product includes at least one free primary or secondary amino group per molecule.

Examples of monoamines are butylamine, cyclohexylamine, aniline or benzylamine, while secondary monoamines are used, if need be, in deficiency referred to functional groups (epoxide groups) to reduce the functionality of the preliminary product, to lower the viscosity, or possibly for the introduction of catalytic groups.

As di- and polyamines can be used aliphatic, araliphatic cycloaliphatic, aromatic or heterocyclic di- and/or polyamines. Examples of these are: ethylene diamine, diethylene triamine, 1,2-diaminopropane, 1,3-diaminopropane, 1,3-diaminobutane, 1,4-diaminobutane, 3-(n-isopropyl-amino)-propylamine, hexapropylene heptamine, 1-cyclohexylamino-3-aminopropane, 1,2-diaminocyclohexane, 1,3-diaminocyclohexane, 1,4-diaminocyclohexane, 1,3-di(aminocyclo-hexyl)propane, N,N'-diethyl-1,3-diaminopropane, N,N'-diethyl-1,4- diaminocyclohexane, N-aminobutylpiperazine, 1,3-dipiperazinylpropane, 1,3-dipiperidylpropane, 3-(2-aminoethyl)-aminopropylamine, N,N'-bis-(3-aminopropyl)-ethylenediamine, the commercial primary aliphatic polyoxypropylene di- or tri-amines, phenylene diamine, 4,4'-diamino-diphenylmethane as well as ether diamines such as 1,7-diamino-3,5-diamino-4-oxa-heptane, 1,7-diamino-3,5-dioxa-heptane, 1,10-diamino-4,7-dioxa-decane, 1,10-diamino-4,7-dioxa-5-methyldecane, 1,11-diamino-6-oxa-undecane, 1,11-diamino-4,8-dioxa-undecane, 1,11-diamino-4,8-dioxa-5-methyl-undecane, 1,11-diamino-4,8-dioxa-5,6-dimethyl-7-propionyl-undecane, 1,12-diamino-4,9-dioxa-dodecane, 1,13-diamino-4,10-dioxa-tridecane, 1,13-diamino-4,7,10-trioxa-5,8-dimethyl-tridecane, 1,14-diamino-4,11-dioxa-tetradecane, 1,14-diamino-4,7,10-trioxatetradecane, 1,16-diamino-4,7,10,13-tetraoxa-hexadecane, 1,20-diamino-4,17-dioxa-eicosane, and especially hexamethylene diamine, 3,3,5(3,5,5)-trimethyl-hexamethylene diamine and 3,3'-dimethyl-4,4'-diaminodicyclohexyl methane and particularly isophorone diamine, N-aminoethyl-piperazine, 1,2-diaminopropane, methyl-pentamethylene diamine, xylyenediamine, or mixtures of these amines and also polyaminoamides or polyalkylene polyamines.

Other compounds can be used in which the di- and polyamines are partially reacted (a) with unsaturated compounds capable of addition of the formula

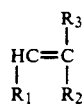

wherein $R_1$ is H, $-CH_3$ or $-C_2H_5$, $R_2$ is H or $-CH_3$ and $R_3$ is $-CN$, $-COOH$, $-COOCH_3$, $-COOC_4H_9$, $-CONH_2$, $-CONHCH_3$ or $-CON(CH_3)_2$.

Preferred are reaction products of di- and polyamines with unsaturated compounds capable of addition of the stated formula, where $R_3$ is $-CN$ as then hardening agents are formed which show particularly good emulsifying properties.

The di- and polyamines may also be partially reacted
b) to form compounds obtained by reductive amination of the amines by reaction with aldehydes or ketones and then hydrogenation,
c) with aldehydes or ketones (so-called schiff bases),
d) with aldehydes, particularly formaldehyde, and phenolic compounds (so-called mannich bases) or
e) to form adducts of amines with compounds containing epoxy groups, but these reaction products must contain at least one free primary or secondary amino group per molecule.

These reactions, particularly items a, c, e, may take place selectively before and/or after the second reaction step. The quantity of amine or amine mixture to be used must be such that the epoxide groups capable of reaction are in a ratio to the hydrogen atoms at the nitrogen of 1:2 to 10. The second reaction step is carried out by directly mixing the product from the first reaction step with the selected amine or amine mixture and treating it at a temperature in the range of 20° to 120° C., preferably 50° to 90° C., for several hours, i.e., 1 to 5 hours. Then the hardener of the invention is ready for use. It may be used either in the form as obtained or emulsified in water, the amount of hardener being selected so that the primary or secondary amino groups of the hardener are in equimolar ratio to the epoxide groups of the epoxy compounds to be hardened.

In the following examples there are described several preferred embodiments to illustrate the invention. However, it is to be understood that the invention is not intended to be limited to the specific embodiments.

EXAMPLE 1

300 g (1.0 val) of propylene oxide-based polyalkylene polyether monoamine having a mean molecular weight of 600 (Jeffamine ® M600) and 417.6 g (2.4 val) of bisphenol-A diglycidyl ether with an epoxide equivalent of 174 were mixed in a reaction vessel with the internal temperature being maintained for 1 hour at 60° C. and for another 2 hours at 80° to 90° C. The product thus obtained had a calculated epoxide equivalent of 513 and the viscosity of the product was 70,200 mPas at 25° C.

EXAMPLE 2

300 g (1.0 val) of the polyalkylene polyetheramine of Example 1 and 522.0 g (3.0 val) of bisphenol-A diglycidyl ether having an epoxide equivalent of 174 were reacted analogously to Example 1 and the resulting product had a calculated epoxide equivalent of 411 and a viscosity of 45,100 mPas at 25° C.

EXAMPLE 3

225 g (1.0 val) of polyalkylene polyetherdiamine with a polyethylene oxide fundamental chain and a mean molecular weight of 900 (Jeffamine ® ED900) and 391.2 g (2.4 val) of bisphenol-F diglycidyl ether with an epoxide equivalent of 163 were reacted analogously to Example 1 to obtain a product with a calculated epoxide equivalent of 552 and a viscosity of 1,340 mPas at 52° C.

EXAMPLE 4

500 g (1.0 val) of polyalkylene polyether monoamine on ethylene oxide base and having a mean molecular weight of 1,000 (Jeffamine ® M1000) and 417.6 g (2.4 val) of bisphenol-A diglycidyl ether with an epoxide equivalent of 174 were reacted analogously to Example 1 to obtain a product with a calculated epoxide equivalent of 655 and viscosity of 6,030 mPas at 25° C.

EXAMPLE 5

500 g (1.0 val) of polyalkylene polyetherdiamine with a polypropylene oxide fundamental chain and having a mean molecular weight of 2,000 (Jeffamine ® D2000) and 391.2 g (2.4 val) of bisphenol-F diglycidyl ether with an epoxide equivalent of 163 were reacted analogously to Example 1 to obtain a product with a calculated epoxide equivalent of 637 and a viscosity of 39,630 at 52° C.

EXAMPLE 6

500 g (1.0 val) of polyalkylene polyetherdiamine with an ethylene oxide fundamental chain and having a mean molecular weight of 2,000 (Jeffamine ® ED2001) and 391.2 g (val) of bisphenol-F diglycidyl ether with an epoxide equivalent of 163 were reacted analogously to Example 1 to obtain a product with a calculated epoxide equivalent of 637 and a viscosity of 26,740 mPas at 52° C.

EXAMPLE 7

500 g (1.0 val) of the polyalkylene polyetherdiamine of Example 6 and 489.0 g (3.0 val) of bisphenol-F diglycidyl ether with an epoxide equivalent of 63 were reacted analogously to Example 1 to obtain a product with a calculated epoxide equivalent of 495 and a viscosity of 57,270 mPas at 25° C.

EXAMPLE 8

225 g (1.0 val) of the polyalkylene poyetherdiamine of Example 3 and 115.0 g (0.5 val) of p-(2,2-dimethylpropyl)-phenol-glycidyl ether with an epoxide equivalent of 230 were mixed in a reaction vessel and the internal temperature was maintained for 1 hour at 60° C. and for another 2 hours at 80° to 90° C. After cooling to 40° C., the product was quickly mixed with 204.6 g (1.1 val) of bisphenol-A diglycidyl ether with an epoxide equivalent of 186. The internal temperature was again maintained for 1 hour at 60° C. and for 2 hours at 80° C. The product obtained had a calculated epoxide equivalent of 908 and a viscosity of 68,045 mPas at 25° C.

EXAMPLE 9

47.8 g of the reaction product of Example 1 were mixed in a reaction vessel with 52.2 g of isophoronediamine and the internal temperature was maintained for 1 hour at 60° C. and for another 2 hours at 80° to 90° C. After cooling to about 50° C., the mixture was diluted with water (solids content 80%). The product obtained had a calculated amine equivalent of 112 and a viscosity of 3,430 mPas at 25° C.

EXAMPLE 10

35.6 g of the reaction product of Example 7 were mixed in a reaction vessel with 64.4 g of isophoronediamine and the internal temperature was maintained for 1 hour at 60° C. and for another 2 hours at 80° to 90° C. After cooling to about 50° C., the mixture was diluted with water (solids content 80%). The product obtained had a calculated amine equivalent of 87 and a viscosity of 1,830 mPas at 25° C.

EXAMPLE 11

48.4 g of the reaction product of Example 7 were mixed in a reaction vessel with 51.6 g of isophoronediamine and the internal temperature was maintained for 1 hour at 60° C. and for another 2 hours at 80° to 90° C. After cooling to about 50° C., the mixture was diluted with water (solids content 80%). The product obtained had a calculated amine equivalent of 108 and a viscosity of 1,970 mPas at 25° C.

EXAMPLE 12

158.3 g of trimethylhexamethylenediamine were charged into a three-neck flask and at 55° to 60° C., 53.1 g of acrylonitrile were added in drops. Thereafter, the internal temperature was maintained for 2 hours at 60° C. After cooling to 40° C., 193.6 g of the reaction product of Example 1 were quickly admixed and the internal temperature was maintained for 1 hour at 60° C. and for another 2 hours at 80° to 90° C. After cooling to about 50° C., the mixture was diluted with water (solids content 80%). The product obtained had a calculated amine equivalent of 192 and a viscosity of 1,860 mPas at 25° C.

EXAMPLE 13

158.3 g of trimethylhexamethylenediamine, 53.1 of acrylonitrile and 255.3 g of the reaction product of Example 3 were reacted analogously to Example 12 and the mixture was diluted with water (solids content 80%) to obtain a product with a calculated amine equivalent of 213 and a viscosity of 83,400 mPas at 25° C.

EXAMPLE 14

158.3 g of trimethylhexamethylenediamine, 53.1 g of acrylonitrile and 122.6 g of the reaction product of Example 4 were reacted analogously to Example 12 and then diluted with water (solids content 80%) to obtain a product with a calculated amine equivalent of 147 and a viscosity of 390 mPas at 25° C.

EXAMPLE 15

158.3 g of trimethylhexamethylenediamine, 53.1 g of acrylonitrile and 116.9 g of the reaction product of Example 5 were reacted analogously to Example 12 and then diluted with water (solids content 80%) to obtain a product with a calculated amine equivalent of 145 and a viscosity of 3,030 mPas at 25° C.

EXAMPLE 16

158.3 g of trimethylhexamethylenediamine, 53.1 g of acrylonitrile and 116.9 g of the reaction product of Example 6 were reacted analogously to Example 12 and then diluted with water (solids content 80%) to obtain a product with a calculated amine equivalent of 145 and a viscosity of 2,760 mPas at 25° C.

EXAMPLE 17

158.3 g of trimethylhexamethylenediamine, 53.1 g of acrylonitrile and 198.5 g of the reaction product of Example 8 were reacted analogously to Example 12 and then diluted with water (solids content 80%) to obtain a product with a calculated amine equivalent of 200 and a viscosity of 1,380 mPas at 25° C.

EXAMPLE 18

Production of the Epoxy Resin Emulsions

The following epoxy resins were used:
A) A bisphenol-A and epichlorohydrin-based epoxy resin with an epoxide equivalent of about 186 and a viscosity of 9,700 mPas at 25° C.
B) A mixture of 80% by weight of a bisphenol-A and epichlorohydrin-based epoxy resin having an epoxide equivalent of about 186 and a viscosity of 9,700 mPas at 25° C. and 20% by weight of versatic acid and epichlorohydrin-based epoxy resin having an epoxide equivalent of 250 and a viscosity of 740 mPas at 25° C.

With the aid of a stirrer, 100 g each of epoxy resins A and B were emulsified with the hardening agents of the invention of Examples 9 to 17 in accordance with the following listing and adjusted with water to a solids content of 60%.

TABLE

| Hardening agent of example | Hardening agent per 100 g of epoxy resin | |
|---|---|---|
| | Epoxy resin A | B |
| 9 | 112 | 120 |
| 10 | 87 | — |
| 11 | — | 116 |
| 12 | 192 | — |
| 13 | 203 | — |
| 14 | 147 | — |

TABLE-continued

| Hardening agent per 100 g of epoxy resin | | |
|---|---|---|
| Hardening agent | Epoxy resin | |
| of example | A | B |
| 15 | 145 | — |
| 16 | 147 | — |
| 17 | — | 215 |

The emulsions showed sufficient stability within the processing time of 0.5 to 6.0 hours. The aqueous dispersions were applied on glass plates using a doctor blade for a layer thicknesses of 120 μm. The films thus obtained showed good film formation, good film spreading and high luster.

TABLE

| Pendulum hardnesses (after Konig) 7-d values Mixture with hardening agent from Example | | | | | | | | | |
|---|---|---|---|---|---|---|---|---|---|
| 9 | 10 | 11 | 12 | 13 | 14 | 15 | 16 | 17 | |
| 199" | 76" | 187" | 53" | 74" | 81" | 69" | 46" | 162" | |

EXAMPLE 19

500 g (1 val) of the polyalkylene polyetherdiamine of Example 5 and 92 g (0.5 val) of phenol-glycidyl ether with an epoxide equivalent of 185 and 185 g (1.0 val) of bisphenol-A diglycidyl ether with an epoxide equivalent of 185 were reacted analogously to Example 8 to obtain a product with a calculated epoxide equivalent of 1,555 and a viscosity at 25° C. of 5,720 mPas.

EXAMPLE 20

74.0 g of the reaction product of Example 19 and 26.0 g of m-xylylenediamine were mixed in a reaction vessel and the internal temperature was maintained for 1 hour at 60° C. and for another 2 hours at 80° to 90° C. to obtain a product with a calculated amine equivalent of 141 and a viscosity at 25° C. of 17,440 mPas.

EXAMPLE 21

61.0 g of the reaction product of Example 19 and 39.0 g of 3,3'-dimethyl-4,4'-diaminodicyclohexylmethane were reacted analogously to Example 20 to obtain a product with a calculated amine equivalent of 165 and a viscosity at 25° C. of 84,010 mPas.

EXAMPLE 22

Comparative Tests

The following resins were used in the procedure of Example 18:
A) A bisphenol-A and epichlorohydrin based epoxy resin with an epoxide equivalent of 185.
B) A phenol and epichlorohydrin based epoxy resin with an epoxide equivalent of 185.

| Mixture | Resin-hardener mixtures: | | | |
|---|---|---|---|---|
| | I | II | III | IV |
| Resin A | 55.1 | 47.1 | 51.0 | 44.1 |
| Resin B | 13.1 | 10.3 | 12.7 | 9.7 |
| Jeffamine ® D2000 | 19.8 | — | 17.9 | — |
| m-Xylylene diamine | 11.2 | 1.0 | — | — |
| 3,3'-Dimethyl-4,4'-diamino-dicyclohexyl methane | — | — | 18.4 | 0.9 |
| Hardening agent according to Ex. 20 | — | 41.6 | — | — |
| Hardening agent according to Ex. 21 | — | — | — | 45.3 |

| Mixture | Resin-hardener mixtures: | | | |
|---|---|---|---|---|
| | I | II | III | IV |
| Pendulum hardness (after Konig) after 24 h at room temp. | 14 sec | 33 sec | — | — |
| Pendulum hardness (after Konig) after 48 h at 10° C. | 11 sec | 21 sec | — | — |
| Elongation after 7 h at room temperature | 26% | 39% | — | — |
| Elongation after 2 h at room temperature and 6 h at 60° C. | — | — | 25% | 38% |

Various modifications of the products and method of the invention may be made without departing from the spirit or scope thereof and it is to be understood that the invention is intended to be limited only as defined in the appended claims.

What we claim is:

1. A hardening agent for epoxy compounds comprising a reaction product of a) preliminary product of at least one member of the group consisting of polyalkylene polyether monoamines or diamines and polyamines with a mean molecular weight of 148 to 5,000 and with at least one member of the group consisting of diepoxy compounds and polyepoxy compounds in a ratio of hydrogen atoms bound to nitrogen and capable of reaction with epoxide to epoxides of di- or polyepoxy compounds of 1:1.4 to 6 and b) at least one member of the group consisting of primary and secondary aliphatic, araliphatic cycloaliphatic, aromatic and heterocyclic mono-, di and polyamines, the amine being such that the ratio of reactive epoxide group to hydrogen atoms on the nitrogen is 1:2 to 10.

2. A hardening agent of claim 1 wherein the polyalkylene polyether monoamines or diamines and polyamines are reacted or admixed with monoepoxy compounds prior to the reaction with the di- or polyepoxy compounds.

3. A hardening agent of claim 1 wherein the amines are partially reacted with a member of the group consisting of a) unsaturated compounds capable of addition, b) aldehydes or ketones followed by hydrogenation, to form compounds obtained by reductive amination of amine c) with aldehydes or ketones, d) aldehydes and phenolic compounds and e) epoxy containing compounds to form adducts of amines.

4. A hardening agent of claim 1 wherein the terminal amino groups are at least partially reacted with a member of the group consisting of a) unsaturated compounds capable of addition, b) aldehydes or ketones followed by hydrogenation, to form compounds obtained by reductive amination of amine c) with aldehydes or ketones, d) aldehydes and phenolic compounds and epoxy containing compounds to form adducts of amines.

5. A hardening agent of claim 1 emulsified in water.

6. A hardener mixture for epoxy compounds comprising a hardening agent of claim 1 and a common amine hardener.

7. A hardener mixture for epoxy compounds comprising a hardening agent of claim 3 and a common amine hardener.

8. A hardening agent of claim 3 wherein aldehyde-phenolic component is a formaldehyde-phenol.

9. A hardener mixture of claim 6 emulsified with water.

10. A method for the production of a hardening agent of claim 1 comprises reacting components a) and b) of claim 1 at 20° to 120° C.

11. The method of claim 10 wherein the ratio of hydrogen to epoxy groups of component a) is 1:2 to 3.

12. The method of claim 10 wherein the diepoxy compound is a polyphenolic glycidyl ether.

13. The method of claim 10 wherein the temperature is 50° to 90° C.

14. A coating made from a mixture of at least one epoxy compound, water and a hardener containing a hardening agent of claim 1.

15. A hydraulic binder containing at least one epoxy compound, water and a hardener containing a hardening agent of claim 1.

16. An adhesive containing at least one epoxy compound and a hardener containing a hardening agent of claim 1.

17. Flexible shaped parts, flat structures and laminates made from at least one epoxy compound and a hardener containing a hardening agent of claim 1.

* * * * *